Figure 1:
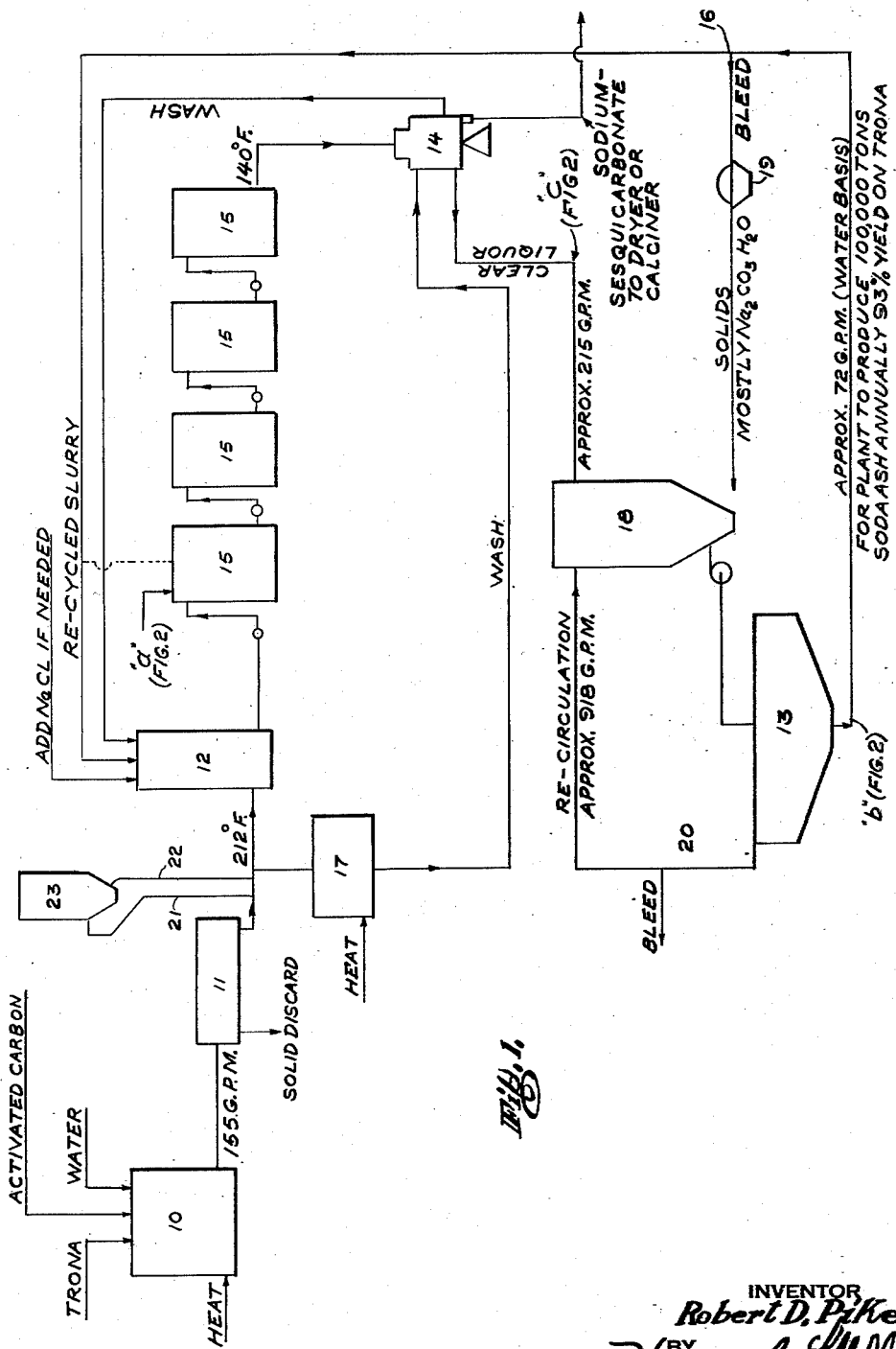

July 9, 1957  R. D. PIKE  2,798,790
PRODUCTION OF SODIUM SESQUICARBONATE
Filed Feb. 1, 1954  2 Sheets-Sheet 1

INVENTOR
Robert D. Pike
BY
ATTORNEYS

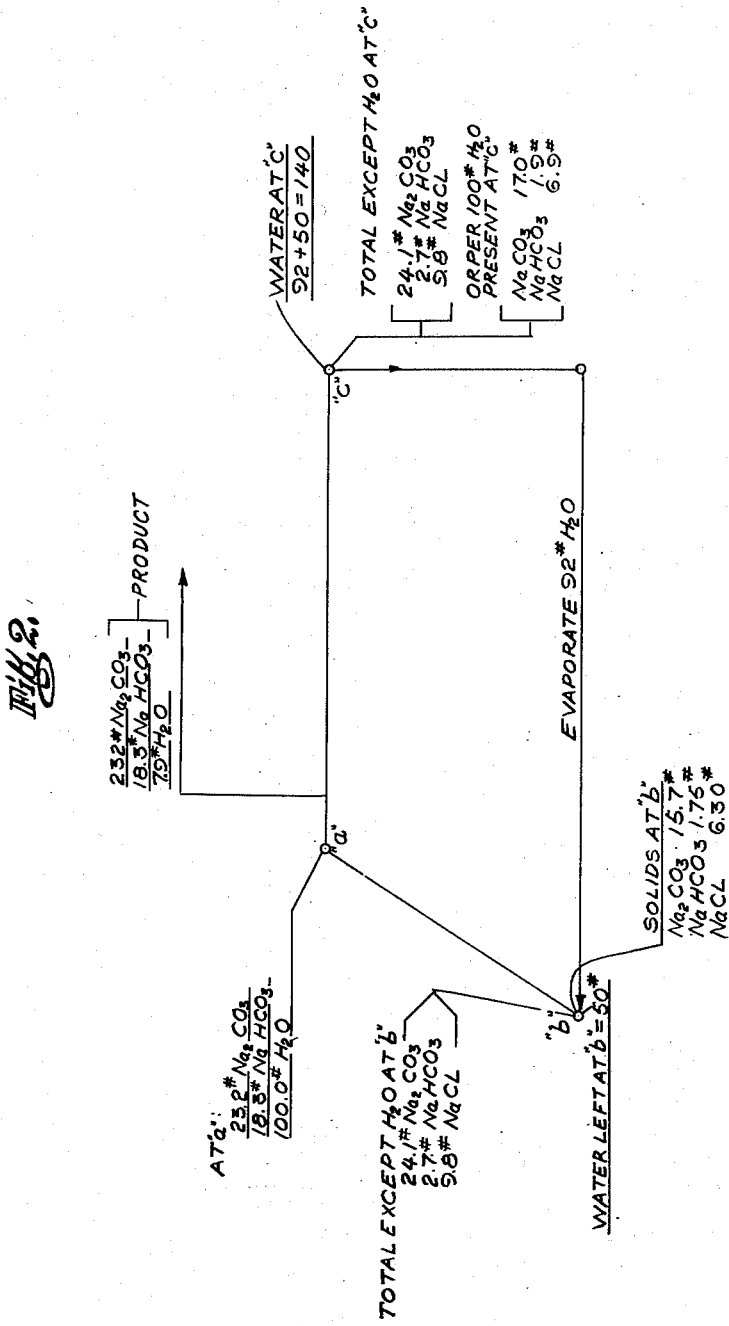

United States Patent Office 2,798,790
Patented July 9, 1957

2,798,790

PRODUCTION OF SODIUM SESQUICARBONATE

Robert D. Pike, Greenwich, Conn.; Kenneth B. Ray and The Stamford Trust Company, executors of said Robert D. Pike, deceased Application February 1, 1954, Serial No. 407,524

9 Claims. (Cl. 23—63)

This invention relates to the production of pure crystallized sodium sesquicarbonate from natural deposit of trona.

A deposit of natural trona has recently been opened up by solid mining operation near Green River, Wyoming, which consists of substantially pure sodium sesquicarbonate contaminated with shale and other slight impurities. In its natural state this deposit has the following approximate composition.

| | Percent |
|---|---|
| $Na_2CO_3$ | 45.21 |
| $NaHCO_3$ | 35.86 |
| $H_2O$ | 15.33 |
| $NaCl$ | .0854 |
| $Fe_2O_3$ | .075 |
| $Na_2SO_4$ | .0356 |
| $Na_2B_4O_7$ | .004 |
| Insoluble | 3.4 |

The trona in the original bed is made up of crystals of almost chemically pure sodium sesquicarbonate which have a brownish color due to the presence of skeletal remains of minute organisms probably artemia salina and mixed with a little water insoluble shale. A water solution of the crude trona except for the slight discoloration is almost chemically pure sodium sesquicarbonate. When treated with an absorbent as, for example, activated carbon to remove the coloring matter and the small amount of iron associated with it, the solution after filtration is substantially chemically pure trona.

In order to purify the trona it is necessary to put it into solution and decolorize in a manner such as described above, but if one attempts to crystallize substantially pure trona or sodium sesquicarbonate from a hot saturated solution of such trona, one finds that the bicarbonate component crystallizes out first, leaving a greater amount of the normal carbonate in solution and that if this solution is then evaporated the end products are sodium bicarbonate and sodium carbonate or a mixture of the two and not the desired sodium sesquicarbonate.

It is an object of this invention to provide a process for the economical recovery of substantially pure crystallized sodium sesquicarbonate from deposits of Green River trona or other natural deposits of trona.

Another object of my invention is to provide a process for the recovery of substantially pure sodium sesquicarbonate from trona in which crystallization can be controlled so as to produce crystals of the desired size for use in detergent compositions and for other purposes.

Various other objects and advantages will appear as this description proceeds.

Sodium sesquicarbonate is composed of crystals of the double salt having the formula $Na_2CO_3 \cdot NaHCO_3 \cdot 2H_2O$. When a saturated solution of Green River trona is made by dissolving the trona in boiling water, it contains 23.2 lbs. $Na_2CO_3$ and 18.3 lbs. $NaHCO_3$ per 100 lbs. of water, but if such a solution is cooled to crystallize out the salts, the bicarbonate crystallizes out first leaving the larger amount of normal carbonate still in solution. In order to crystallize out the bicarbonate and the normal carbonate in the desired ratio corresponding to the sesquicarbonate, it is necessary to provide in the solution an excess amount of the normal carbonate and I do this in the present process by circulating a slurry containing an excess of the normal carbonate and preferably a substantial amount of sodium chloride and mixing this solution with the hot saturated solution of trona prior to crystallization to thereby influence the crystallization in such a way that the normal carbonate and the bicarbonate crystallize out in the ratio corresponding to the sesquicarbonate after which the circulating solution of normal carbonate preferably carrying also a substantial amount of sodium chloride is concentrated by evaporation and recirculated to mix with fresh trona solution to crystallize further sesquicarbonate therefrom.

Cooling agitation and crystallization of the hot mixed solution is preferably controlled in such a way as to give the desired crystal size to the sesquicarbonate crystals. The sodium chloride also assists in controlling the crystal size of the sesquicarbonate.

In carrying out my process, I first pulverize the crude mined trona so as to promote rapid solution and then dissolve it in boiling hot water, or in the hot solution produced by solution mining as covered in U. S. Patent No. 2,625,384, filed jointly by M. Y. Seaton and the present inventor. I preferably remove the coloring matter from this solution by the addition of activated carbon, usually amounting to about one-tenth of 1 percent of the weight of the solution after filtration. I may evaporate the solution at this point, preferably in an auxiliary submerged combustion evaporator, to remove any small amount of surplus water which may be introduced in the process of solution mining, as covered by said Patent No. 2,625,384. However, this amount of water at most is only about 12½ percent of the total and its evaporation at this point, if required, does not constitute a serious burden on the process. After filtration and evaporation, if the latter is required, the solution is cooled by any suitable means to about 140° F. To promote crystallization of sodium sesquicarbonate during cooling, a hot slurry containing about 32 percent solids, largely sodium carbonate monohydrate, is introduced into the new hot clarified solution of trona. This may be done just before cooling starts, or at any other desired point in the cooling or in increments at various stages during the cooling. The mixture of new solution and recycled slurry is retained in holding or crystallization vessels with gentle agitation for a sufficient length of time to produce the desired crystals of sodium sesquicarbonate. These are removed on a filter or by a centrifuge and washed free of NaCl, which is preferably carried in the recycled slurry. These crystals when dried constitute the primary product of my process.

The mother liquor is next subjected to evaporation, producing a slurry, the solid content of which is $Na_2CO_3H_2O$, $NaCl$, $NaHCO_3$, in the order named in relation to the relative amount present; the $NaHCO_3$, however, being a minor constituent. I prefer to bleed a certain amount of sodium carbonate and sodium chloride from the recirculating slurry by removing a part of the solids from this slurry. This will very effectively take care of any build-up in the cycle of $NaCl$ and $Na_2CO_3$, and particularly the latter. This is important, because a small loss of $CO_2$ from the hot liquor is unavoidable and as the feed and crystallized products are both sodium sesquicarbonate, this may lead to a build-up of $Na_2CO_3$ in the circulation. Also when the liquor from solution mining is used for dissolving the dry mined trona, such liquor may contain a surplus of $Na_2CO_3$ over the amount called for in sodium sesquicarbonate and such surplus, if present, will accumulate in the circulation until finally the sodium sesquicarbonate will become contaminated with $Na_2CO_3$, which is undesirable. However, this tendency can be entirely overcome by a suitable removal of a part of the solids in the recycled slurry and furthermore, the composition of these solids is such that it is easy to remove from them their content of $Na_2CO_3$, which then becomes a valuable product of the process. After discard, the remaining slurry from the evaporator is recycled to the main new flow of solution preferably at the cooling step.

Having described my invention in general terms, I shall now refer to the drawings in which Fig. 1 represents a diagrammatic flow sheet and Fig. 2 shows the principal quantitative relations occurring at points a, b, c of Fig. 1.

In the drawings, 10 is a tank for dissolving, preferably supplied with an agitator, not shown. Into this dissolving tank the pulverized trona, hot water and activated carbon are introduced in continuously weighed streams. The dissolving action takes about ½ hour. The outgoing solution amounting to 155 gallons per minute contained water, for a plant producing 143,000 tons annually sodium sesquicarbonate, is filtered at 11. At this point the temperature is only slightly below 212° F. and the liquor is water white. The proportion of water and trona are so chosen in 10 that there is preferably a slight excess of water so that the unavoidable or small amount of cooling in passing through the filter and on to the cooler 12 will not cause any crystallization of solids, which at this point would be sodium bicarbonate. Ordinarily the small amount of water used as wash water on the filter 11 will furnish this surplus. As pointed out above, it may be necessary at this point to evaporate about 12½ percent surplus water which may be introduced into the circulation as the result of using solution mining as covered in said Patent No. 2,625,384. This may be readily done by diverting the flow from the filter through line 21 into auxiliary submerged combustion evaporator 23 and back into the line again through pipe 22.

Entering the cooler 12, the stream of trona in solution meets a portion or all of the hot recycled slurry from thickener 13, the wash from centrifuge 14 and any make-up NaCl which may be required to maintain the NaCl concentration at the desired level to promote formation of large crystals of sodium sesquicarbonate. If desired, only a portion of the recycled slurry may be introduced into the cooler, said other portions of the recycled slurry may be added in the precipitators 15.

The introduction of the hot slurry containing a substantial amount of solids into the saturated solution of trona causes crystallization of the sodium sesquicarbonate from the purified trona solution, and dependent upon the rate of slurry addition and the rate of cooling, the size of the sesquicarbonate crystals can be influenced to produce the size most desired.

The cooler 12 may be of any desired type and cooling is effected in both the cooler and in the so-called precipitators 15 so that the stream amounting to about 215 gallons per minute will leave the precipitators at about 140° F. However, the cooler and precipitators may be the same type of vessel. For example, the stream from filter 11 may enter the first of a series of thickeners which are provided with cooling means. There is a certain normal amount of cooling when hot liquor is passed through a thickener, but I prefer to assist such cooling by providing the thickener with water jackets on its external surfaces through which cooling water is circulated. A cascade system of four thickeners of this type may replace the cooler 12 ad precipitators 15, which I have shown in Fig. 1, and has the advantage of simplicity combined with slow cooling and gentle agitation, tending to promote the formation of pure crystals of sodium sesquicarbonate of the most desirable type and size. As stated above, the recycled slurry may be added to the saturated and filtered trona solution all at once or in increments during the cooling to promote crystallization and formation of desired crystal sizes.

Whatever device may be employed for cooling and precipitation of crystals, the stream will leave at about 140° F. and will contain all of the purified and crystallized sodium sesquicarbonate equivalent to the crude trona dissolved in 10. The crystals may be separated from the mother liquor by a centrifuge 14. The mother liquor leaving the centrifuge 14 will have approximately the following composition, represented as pounds per 100 pounds $H_2O$, present at point c.

| | |
|---|---|
| $Na_2CO_3$ | 17.0 |
| $NaHCO_3$ | 1.9 |
| NaCl | 6.9 |

This composition is based upon the assumption that the feed to the crystallizers is a saturated solution of sodium sesquicarbonate in boiling hot water, but if the trona be dissolved in hot liquor from solution mining, there may be present in the feed, though not necessarily so, more than one (1) mol $Na_2CO_3$ per mol $NaHCO_3$. If this be the case, the relative concentration of $Na_2CO_3$ at c may be allowed to build up a little without preventing the crystallization of pure sodium sesquicarbonate, so long as the input and output of $Na_2CO_3$ are balanced by the bleed of the slurry at 16.

The slurry of sodium sesquicarbonate crystals from 15 goes directly to the centrifuge 14 where the crystals are dewatered and washed free of NaCl by using a part of the fresh hot solution from the filter 11, which may be conveniently stored in heated tank 17. The evaporator 23, if used, precedes the tank 17.

The clear liquor from the centrifuge 14, amounting to about 215 G. P. M., must now be evaporated to remove added water. In the evaporation, about 92 lbs. water must be evaporated for every 100 lbs. present in the stream entering the cooler 12. This is because the crystallized sesquicarbonate removes with it about 8 lbs. water of crystallization. The 92 lbs. which must be evaporated correspond to about 49.5 lbs. pure trona, or about 1.85 lbs. water per lb. actual trona introduced in the feed.

I prefer to carry out this evaporation in the submerged combustion evaporator 18, which operates in closed circuit with a thickener 13. The effluent from the evaporator 18 goes directly to the thickener 13. I may use a magma from the evaporator containing as little as 3.6 percent solid crystals. The recycled slurry constituting the underflow of thickener 13 amounts to about 72 G. P. M. The overflow may amount to as much as 918 G. P. M. and this is returned directly to the evaporator and results in establishing a high degree of liquid mobility therein.

The solids in the underflow corresponding to 100 pounds water in the feed at point a, or to 49.5 pounds actual trona in the feed, amount to about:

| | Pounds |
|---|---|
| $Na_2CO_3$ | 15.7 |
| $NaHCO_3$ | 1.75 |
| NaCl | 6.30 |

The total salt content of the slurry at this point, including solid salts and salts in solution, is per 100 pounds water in the feed at point a approximately:

| | Pounds |
|---|---|
| $Na_2CO_3$ | 24.1 |
| $NaHCO_3$ | 2.7 |
| NaCl | 9.8 |

Any proportion of the solids required to maintain an $Na_2CO_3$ balance as above described may be removed by diverting the desired proportion of the stream of recycled slurry at 16 to a filter or centrifuge 19, and immediately returning the mother liquor to the recycling stream on its way to 12. The solids thus removed may be very easily treated for the removal of $Na_2CO_3$, and the balance, after such removal, is returned to the recycling stream. If there is a tendency for NaCl or other soluble materials which occur in the trona in very minor amounts to build up in the circulation, these may be kept at a desired level by removing a very small amount of the recirculation at any desired point, such for example as at 20. This discard being of the order of 1 or 2 percent is so small as to hardly merit treatment for recovery of its constitutents. Also if the unbalance of $Na_2CO_3$ is very slight in the feed, a discard from the point 19 may be omitted.

Figure 2 shows the respective amounts of salts recirculated to the cooler 12 or the precipitators 15 and the amount added by dissolving fresh trona in hot water at 10. At the point $b$ the amount of solids in the recirculating slurry from the underflow from the thickener 13 is $Na_2CO_3$ 15.7 pounds, $NaHCO_3$ 1.75 pounds, and NaCl 6.30 pounds per 100 pounds of water added at point $a$ and the total amount of recirculating salts (solids and in solution) is 24.1 pounds $Na_2CO_3$, 2.7 pounds $NaHCO_3$, and 9.8 pounds NaCl per 100 pounds of water added at $a$.

At the point $a$, which may be at the entrance to the cooler 12, or at any of the precipitators 15, this slurry meets the solution from 10 which consists of 23.2 pounds $Na_2CO_3$ and 18.3 pounds $NaHCO_3$ per 100 pounds water added at $a$. In the precipitators 15, 23.2 pounds $Na_2CO_3$, 18.3 pounds $NaHCO_3$ and 7.9 pounds water are crystallized out so as to leave at point $c$ in the mother liquor from centrifuge 14, $Na_2CO_3$ 24.1 pounds, $NaHCO_3$ 2.7 pounds, and NaCl 9.8 pounds per 100 pounds of water added at $a$. At this stage the remaining water added at $a$ or 92 pounds is removed in the evaporator 18.

The 50 pounds of water present at $c$ which with the 92 pounds gives a total of 142 pounds per 100 pounds of water added at $a$, is that which is necessary for recirculation to keep the circuit liquid. As noted above, the actual concentration expressed in terms of 100 pounds water present at $c$ is $Na_2CO_3$, 17.0 pounds, $NaHCO_3$, 1.9 pounds, and NaCl, 6.9 pounds.

The term "water" as used herein is used in its normal meaning of ground or tap water as distinguished from brines. Such water is essentially pure, but contains the normal impurities found in ground or tap water.

This application is a continuation in part of my copending application Serial No. 174,624 filed July 19, 1950, now abandoned.

While I have illustrated a preferred embodiment of my process, it will be understood that various modifications and changes may be made therein without departing from the spirit of my invention or the scope of the following claims.

I claim:

1. A cyclic process for producing refined sesquicarbonate from Wyoming trona which comprises forming a hot clarified substantially saturated solution of trona in water from which sodium sesquicarbonate will not crystallize on cooling, mixing recycled sodium carbonate monohydrate slurry with said saturated solution of trona in water to convert it into a solution from which sodium sesquicarbonate will crystallize on cooling, cooling the solution slowly to produce substantially only crystals of sodium sesquicarbonate, removing the formed crystals, evaporating the mother liquor to remove the added water therefrom and again produce a slurry containing crystals of $Na_2CO_3 \cdot H_2O$ in an amount at least sufficient to convert another such solution into one from which sodium sesquicarbonate will precipitate on cooling, and recycling the slurry to another solution of trona in hot water to maintain the cycle and convert the solution into one from which sodium sesquicarbonate will crystallize on cooling.

2. A cyclic process for producing refined sodium sesquicarbonate from Wyoming trona which comprises forming a hot clarified substantially saturated solution of trona in water from which sodium sesquicarbonate will not crystallize on cooling, mixing recycled sodium carbonate monohydrate slurry in increments with said saturated solution of trona in water to convert it into a solution from which sodium sesquicarbonate will crystallize on cooling, cooling the solution slowly to produce substantially only crystals of sodium sesquicarbonate, removing the formed crystals, evaporating the mother liquor to remove the added water therefrom and again produce a slurry containing crystals of $Na_2CO_3 \cdot H_2O$ in an amount at least sufficient to convert another such solution into one from which sodium sesquicarbonate will precipitate on cooling, and recycling the slurry to another solution of trona in hot water to maintain the cycle and convert the solution into one from which sodium sesquicarbonate will crystallize on cooling.

3. A process for producing refined sesquicarbonate from Green River trona, which comprises forming a hot decolorized substantially saturated solution of the trona in water from which sodium sesquicarbonate will not crystallize on cooling, mixing recycled sodium carbonate slurry with sodium bicarbonate in the approximate ratio of 24.1 lbs. $Na_2CO_3$ to 2.7 lbs. $NaHCO_3$ per 100 lbs. of water in said saturated solution with said saturated solution of trona in water to convert it into a solution from which sodium sesquicarbonate will crystallize on cooling, cooling the solution slowly to produce crystals of sodium sesquicarbonate, removing the formed crystals, evaporating the mother liquor to remove the added water therefrom and again produce a slurry containing crystals of $Na_2CO_3 \cdot H_2O$, and recycling the slurry to another solution of trona in hot water to maintain the cycle and convert the solution into one from which sodium sesquicarbonate will crystallize on cooling.

4. A cyclic process for producing refined sesquicarbonate from Green River trona which comprises forming a hot decolorized substantially saturated solution of the trona in water from which sodium sesquicarbonate will not crystallize on cooling, mixing recycled sodium carbonate monohydrate and sodium chloride slurry with said saturated solution of trona in water to convert it into a solution from which sodium sesquicarbonate will crystallize on cooling, cooling the solution slowly to produce substantially only crystals of sodium sesquicarbonate, removing the formed crystals, evaporating the mother liquor to remove the added water therefrom and again produce a slurry containing crystals of $Na_2CO_3 \cdot H_2O$ and NaCl, said mother liquor slurry from which the water has been evaporated containing crystals of sodium carbonate in an amount sufficient to convert another such solution into one from which sodium sesquicarbonate will precipitate on cooling, and recycling the slurry to another solution of trona in hot water to maintain the cycle and convert the solution into one from which sodium sesquicarbonate will crystallize on cooling.

5. A process for producing refined sodium sesquicarbonate from Green River trona which comprises producing a hot clarified under-saturated solution of the trona in water from which sodium sesquicarbonate will not crystallize on concentration and cooling and evaporating substantially to saturation, mixing recycled sodium carbonate slurry containing approximately 24.1 lbs. $Na_2CO_3$, 2.7 lbs. $NaHCO_3$ and 9.8 lbs. NaCl per 100 lbs. $H_2O$ in said saturated solution with said saturated solution of trona in water to convert it into a solution from which sodium sesquicarbonate will crystallize on cooling, cooling the solution slowly to produce crystals of sodium sesquicarbonate, removing the formed crystals, evaporating the mother liquor to remove the added water and again produce a slurry containing crystals of $Na_2CO_3 \cdot H_2O$ and of approximately the composition above specified, and recycling the slurry to said solution of trona in hot water.

6. A cyclic process for producing refined sodium sesquicarbonate from Green River trona which comprises forming a hot clarified substantially saturated solution of trona in water containing an excess of $Na_2CO_3$ from which sodium sesquicarbonate will not crystallize on cooling, mixing recycled sodium carbonate monohydrate slurry with said saturated solution of trona in water to convert it into a solution from which sodium sesquicarbonate will crystallize on cooling, cooling the solution slowly to produce substantially only crystals of sodium sesquicarbonate, removing the formed crystals, evaporating the mother liquor to remove the added water and again produce a slurry containing crystals of $Na_2CO_3 \cdot H_2O$ in an amount at least sufficient to convert another such solution into one from which sodium sesquicarbonate will precipitate on cooling, and recycling the slurry to another solution of trona in hot water, after removing sufficient $Na_2CO_3$ to balance the surplus build-up of $Na_2CO_3$, into the circulation system to maintain the cycle and convert the solution into one from which sodium sesquicarbonate will crystallize on cooling.

7. A cyclic method of producing refined sodium sesquicarbonate from Wyoming trona which comprises dissolving trona in hot essentially pure water to provide a solution from which sodium sesquicarbonate will not crystallize on cooling, filtering the dissolved trona and adding to the hot filtered solution of trona in water a recirculating slurry of sodium carbonate monohydrate crystals mother liquor containing sufficient excess of normal sodium carbonate over sodium bicarbonate to form a liquor with said solution of trona in water from which sodium sesquicarbonate will precipitate on cooling, cooling said mixed liquor and precitating and recovering substantially only sodium sesquicarbonate therefrom, evaporating water from the mother liquor to again produce a slurry of sodium carbonate monohydrate crystals containing said excess of normal sodium carbonate over sodium bicarbonate and recycling said slurry to another hot solution of trona in water to maintain the cycle and to again form a liquor from which further sodium sesquicarbonate will precipitate.

8. In a cyclic process for the recovery of sodium sesquicarbonate from a solution of trona in hot water from which sodium sesquicarbonate will not crystallize on cooling, the improvement which comprises adding to said solution a slurry of sodium carbonate monohydrate crystals in water containing about 9 parts of sodium carbonate to 1 part of sodium bicarbonate to produce a solution from which sodium sesquicarbonate will crystallize on cooling, crystallizing sodium sesquicarbonate from said combined solution, separating the crystallized sodium sesquicarbonate from the mother liquor, concentrating the mother liquor to provide a slurry of sodium carbonate monohydrate crystals containing about 9 parts of sodium carbonate to 1 part of sodium bicarbonate and recycling said mother liquor to another solution of trona in hot water to maintain the cycle and to provide another solution from which sodium sesquicarbonate may be crystallized.

9. In a cyclic process for the recovery of sesquicarbonate from a substantially saturated solution of trona in hot water containing approximately 23.2 lbs. $Na_2CO_3$, and approximately 18.3 lbs. $NaHCO_3$ for each 100 lbs. $H_2O$, the improvement which comprises adding to the said hot solution of trona in water, a slurry of sodium carbonate monohydrate crystals in water containing approximately 24.1 lbs. $Na_2CO_3$, 2.7 lbs. $NaHCO_3$, and 9.8 lbs. NaCl for each 100 lbs. $H_2O$, cooling said combined solution and crystallizing sodium sesquicarbonate from said combined solution, separating the crystallized sodium sesquicarbonate from the mother liquor, concentrating the mother liquor to provide a slurry of sodium carbonate monohydrate crystals containing about 24.1 lbs. $Na_2CO_3$, 2.7 lbs. $NaHCO_3$ and 9.8 lbs. NaCl for each 100 lbs. $H_2O$ and recycling said concentrated mother liquor to another solution of trona in hot water to maintain the cycle and to provide another solution from which sodium sesquicarbonate may be crystallized.

References Cited in the file of this patent

UNITED STATES PATENTS

| | | |
|---|---|---|
| 1,396,841 | Hirschkind | Nov. 15, 1921 |
| 1,911,794 | Britton | May 30, 1933 |
| 2,049,249 | Cummingham | July 28, 1936 |
| 2,346,140 | Pike | Apr. 11, 1944 |